United States Patent
Yang et al.

(10) Patent No.: US 9,791,122 B2
(45) Date of Patent: Oct. 17, 2017

(54) REAR LAMP FOR VEHICLE

(71) Applicant: Hyundai Motor Company, Seoul (KR)

(72) Inventors: Jeong Gyu Yang, Yongin-Si (KR); Young Sub Oh, Suwon-si (KR); Bock Cheol Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 212 days.

(21) Appl. No.: 14/525,136

(22) Filed: Oct. 27, 2014

(65) Prior Publication Data

US 2015/0292703 A1    Oct. 15, 2015

(30) Foreign Application Priority Data

Apr. 10, 2014    (KR) .................. 10-2014-0042721

(51) Int. Cl.
| | |
|---|---|
| *F21S 4/00* | (2016.01) |
| *F21S 8/10* | (2006.01) |
| *B60Q 1/00* | (2006.01) |
| *B60Q 1/26* | (2006.01) |

(52) U.S. Cl.
CPC .......... *F21S 48/215* (2013.01); *B60Q 1/0058* (2013.01); *B60Q 1/2607* (2013.01); *F21S 48/2243* (2013.01); *F21S 48/2268* (2013.01); *F21S 48/2281* (2013.01); *F21S 48/238* (2013.01); *F21S 48/25* (2013.01)

(58) Field of Classification Search
CPC .. F21S 48/2225; F21S 48/2243; F21S 48/236; F21S 48/20; B60Q 1/0058; B60Q 1/2607
USPC ................................. 362/498–499, 520
See application file for complete search history.

(56) References Cited

U.S. PATENT DOCUMENTS

| | | | |
|---|---|---|---|
| 6,286,984 B1* | 9/2001 | Berg | F21S 48/215 362/227 |
| 2009/0034282 A1 | 2/2009 | Nakamura et al. | |
| 2014/0211449 A1* | 7/2014 | Nomura | B60Q 1/302 362/84 |
| 2016/0215950 A1* | 7/2016 | Ender | B60Q 1/0058 |

FOREIGN PATENT DOCUMENTS

| | | | |
|---|---|---|---|
| JP | 2003-187613 A | 7/2003 | |
| JP | 2005-209448 A | 8/2005 | |
| JP | 2007-123028 A | 5/2007 | |

(Continued)

*Primary Examiner* — Sean Gramling
*Assistant Examiner* — Gerald J Sufleta, II
(74) *Attorney, Agent, or Firm* — Morgan, Lewis & Bockius LLP

(57) ABSTRACT

A rear lamp for a vehicle may have a light source module capable of simultaneously implementing functions of a tail lamp and a brake lamp in one lighting region, the light source module including a plurality of light emitting diode (LED) light sources for the tail lamp, a plurality of separation printed circuit boards (PCBs) for the tail lamp controlling current supply into the plurality of LED light sources, a pattern film for the tail lamp having an optic formed to implement three-dimensional emitting images with a desired pattern using light of the plurality of LED light sources, an optical resin stacked on the pattern film and uniformly transferring the light of the plurality of LED light sources across the entire section of the pattern film, and an LED light source for the brake lamp.

9 Claims, 5 Drawing Sheets

(56) References Cited

FOREIGN PATENT DOCUMENTS

| KR | 10-2001-0067043 A | 7/2001 |
| KR | 10-0803310 B1 | 2/2008 |
| KR | 10-2011-0021474 A | 3/2011 |

* cited by examiner

US 9,791,122 B2

REAR LAMP FOR VEHICLE

CROSS REFERENCE TO RELATED APPLICATION

The present application claims priority to Korean Patent Application No. 10-2014-0042721, filed Apr. 10, 2014, the entire contents of which is incorporated herein for all purposes by this reference.

BACKGROUND OF THE INVENTION

Field of the Invention

The present invention relates to a rear lamp for a vehicle, and more particularly, to a rear lamp for a vehicle capable of simultaneously implementing functions of a tail lamp and a brake lamp of three-dimensional emitting images in one lighting region.

Description of Related Art

As shown in FIG. 1, a rear lamp of a vehicle is provided with a tail lamp 1 lighted to prevent collision of a rear vehicle, a brake lamp 2 lighted upon braking, and the like, wherein the tail lamp 1 and the brake lamp 2 are typically configured to have lighting regions separated from each other by the respective lamp housings.

Therefore, as the rear lamp according to the related art is provided with the lighting region in which the tail lamp 1 and the brake lamp 2 are separated from each other, the rear lamp has a large size, has a heavy weight, is expensive, and has to secure a relatively large installation space in a vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear lamp for a vehicle capable of simultaneously implementing functions of a tail lamp and a brake lamp in one lighting region to promote a reduction in weight and cost by a reduction in size and more easily secure an installation space and to promoting luxuriousness improvement of a vehicle by implementing three-dimensional emitting images at the time of lighting the tail lamp.

According to various aspects of the present invention, a rear lamp for a vehicle may include a light source module capable of simultaneously implementing functions of a tail lamp and a brake lamp in one lighting region, the light source module including a plurality of light emitting diode (LED) light sources for the tail lamp, a plurality of separation printed circuit boards (PCBs) for the tail lamp controlling current supply into the plurality of LED light sources for the tail lamp and installed to each be electrically connected to each of the plurality of LED light sources for the tail lamp, a pattern film for the tail lamp installed to be simultaneously stacked on the plurality of separation PCBs for the tail lamp and having an optic formed on the pattern film to implement three-dimensional emitting images having a desired pattern using light of the plurality of LED light sources for the tail lamp, an optical resin stacked on the pattern film for the tail lamp and uniformly transferring the light of the plurality of LED light sources for the tail lamp across an entire section of the pattern film for the tail lamp, and at least one LED light source for the brake lamp installed between the plurality of LED light sources for the tail lamp and implementing an emitting image of the brake lamp.

The light source module may further include a bracket having the separation PCBs for the tail lamp and the at least one LED light source for the brake lamp fixedly installed thereon, integrally covering side portions and rear portions of the stacked pattern film for the tail lamp and the optical resin, and having a circular arc reflecting part formed on the bracket for irradiating the light of the at least one LED light source for the brake lamp to a front surface of the light source module, and a deposition reflecting surface coupled to a front surface of the bracket opposite to the pattern film for the tail lamp and an inner surface of the reflecting part in the bracket, back-reflecting light of the LED light sources for the tail lamp scattered to a rear of the light source module to the front of the light source module at the time of lighting the LED light sources for the tail lamp, reflecting light of the at least one LED light source for the brake lamp to the front at the time of lighting the LED light source for the brake lamp, and implementing a hidden effect due to deposition at the time of non-lighting of the LED light sources for the tail lamp and the LED light source for the brake lamp.

The light source module may further include a protecting film stacked on the optical resin, protecting the optical resin and maintaining a shape of the optical resin.

The light source module may further include a bezel integrally coupled to the optical resin along an edge of the optical resin and implementing a bezel image by the deposition together with the deposition reflecting surface at the time of the non-lighting of the LED light sources for the tail lamp.

A portion of the pattern film for the tail lamp opposite to the circular arc reflecting part may be cut, the cut portion of the pattern film for the tail lamp may be installed with a pattern film for a brake lamp, and the pattern film for the brake lamp may be provided with an optic to implement the emitting image of the brake lamp having a desired pattern using the light of the LED light source for the brake lamp.

The optic formed on the pattern film for the brake lamp may be formed to have directionality different from the optic formed on the pattern film for the tail lamp to improve light distribution efficiency of the LED light source of the brake lamp.

The optic formed on the pattern film for the brake lamp may be formed to form an angle of 90° with respect to the optic formed on the pattern film for the tail lamp.

The LED light sources for the tail lamp may be installed to be spaced apart from each other by a predetermined interval along a horizontal direction of the bracket at upper and lower portions of the bracket, and the at least one LED light source for the brake lamp may be installed at a middle portion in a vertical direction of the bracket or be installed one by one between the LED light sources for the tail lamp at the upper and lower portions of the bracket.

The light source module may be fixed on a lamp housing having one lighting region, and the lamp housing may be fixedly installed on a vehicle body.

The light source module may be formed in a flexible plate shape which is bendable to a curved surface.

According to various aspects of the present invention, a rear lamp for a vehicle having light emitting diode (LED) light sources for a tail lamp and an LED light source for a brake lamp may be simultaneously installed in one lighting region included in a lamp housing.

Emitting images implemented by the LED light sources for the tail lamp may be three-dimensional emitting images.

The three-dimensional emitting images implemented by the LED light sources for the tail lamp may have a non-lighting inactive region in which the three-dimensional emitting images are not implemented therebetween; and an emitting image implemented by the LED light source for the brake lamp may be implemented by the non-lighting inactive region.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to various embodiments of the present invention, a rear lamp for a vehicle capable of simultaneously implementing functions of a tail lamp and a brake lamp in one lamp housing 10 having one lighting region 11 may promote a reduction in size of the rear lamp and a reduction in weight and cost by simultaneously implementing the tail lamp and the brake lamp in one lighting region 11, as shown in FIGS. 2 to 7.

Figure 1:
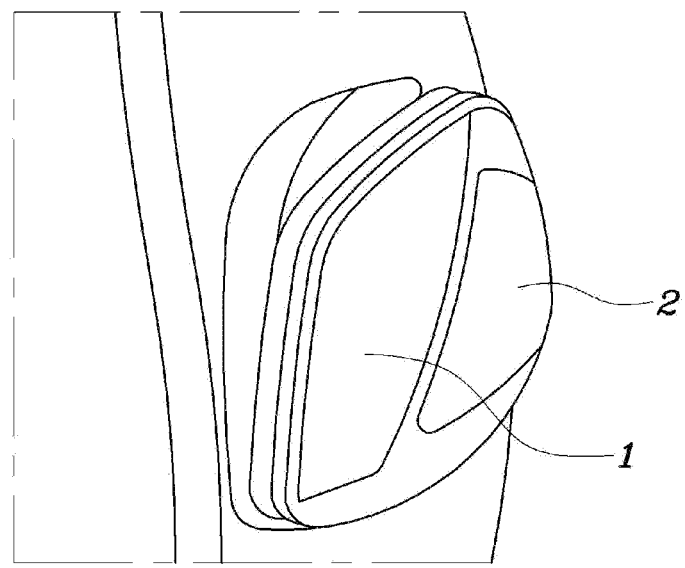
FIG. 1 is a view illustrating a rear lamp for a vehicle configured by lighting region having a tail lamp and a brake lamp separated from each other according to the related art.
Figure 2:
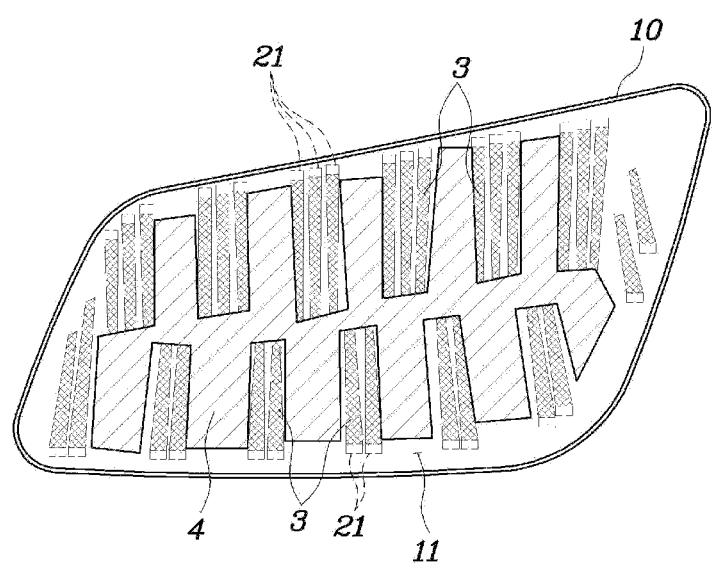
FIG. 2 is a view illustrating a three-dimensional emitting image implemented by a tail lamp of the exemplary rear lamp according to the present invention.

In implementing an emitting image at the time of lighting the tail lamp, in recent, a technology of implementing three-dimensional emitting images 3 having a three-dimensional effect as shown in FIG. 2 has been gradually expanded to improve luxuriousness of a vehicle and satisfy requirements of consumers.

Figure 3:
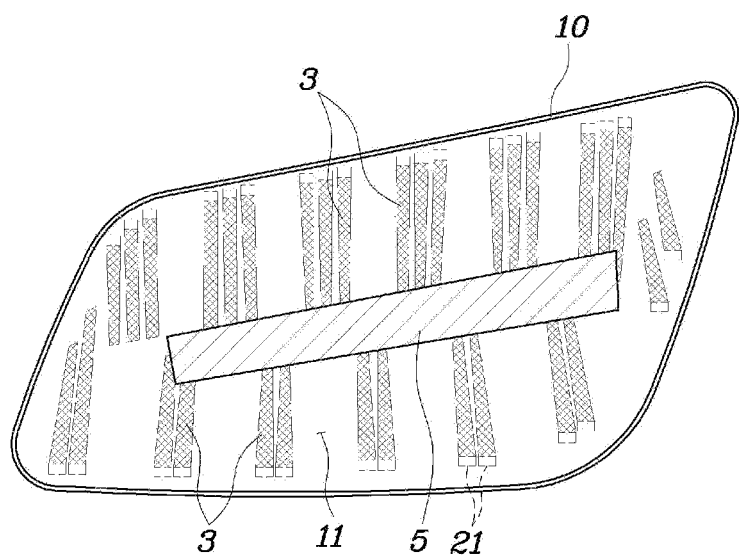
FIG. 3 and FIG. 4 are views for describing states in which an emitting image of a brake lamp of the exemplary rear lamp is implemented using a non-lighting inactive region which does not implement a three-dimensional emitting image at the time of lighting of the tail lamp according to the present invention.
Figure 4:
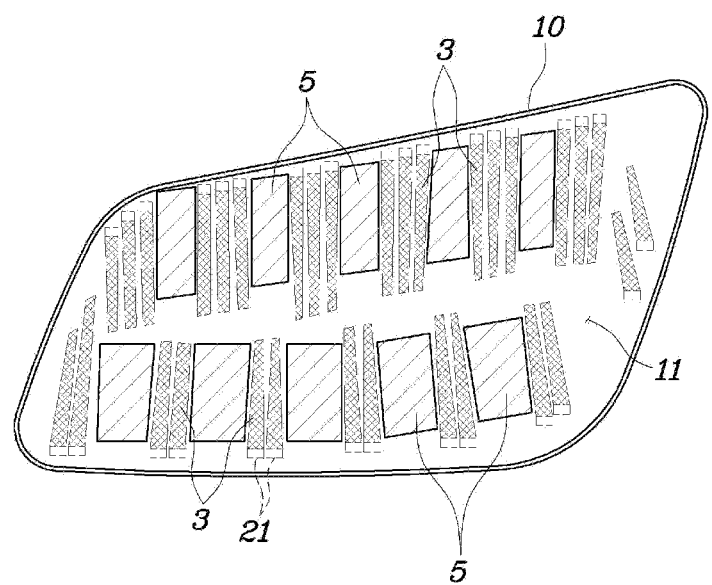
Figure 5:
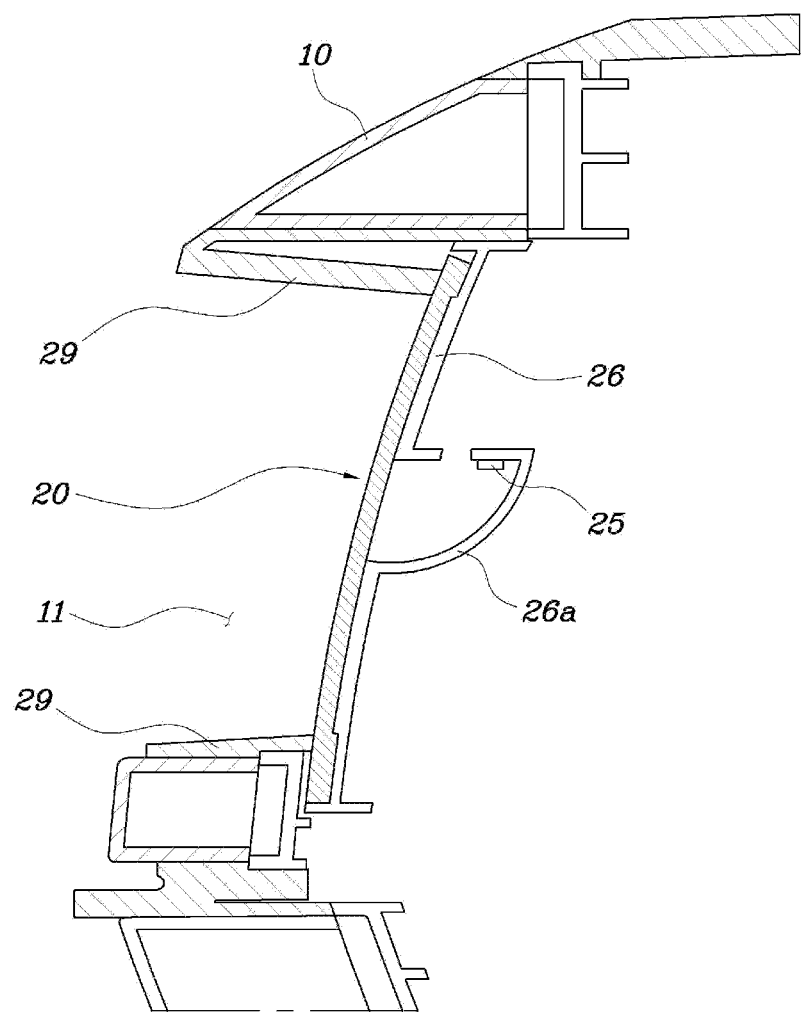
FIG. 5 is a cross-sectional view of FIG. 3 for describing the exemplary rear lamp according to the present invention.

However, when the three-dimensional emitting images 3 are implemented, a non-lighting inactive region 4 in which the three-dimensional emitting image 3 is not implemented is present between the three-dimensional emitting images 3, in which the non-lighting inactive region 4 is a region to which light of a light source is not sufficiently irradiated. Therefore, various aspects of the present invention have a configuration in which an emitting image 5 of the brake lamp is simultaneously implemented in one lighting region 11 using the non-lighting inactive region 4 as shown in FIGS. 3 and 4.

That is, the rear lamp according to various embodiments of the present invention includes a light source module 20 capable of simultaneously implementing functions of a tail lamp and a brake lamp in one lighting region, wherein the light source module 20 includes a plurality of LED light sources 21 for the tail lamp; a plurality of separation PCBs 22 for the tail lamp controlling current supply into the plurality of LED light sources 21 for the tail lamp and installed to each be electrically connected to each of the plurality of LED light sources 21 for the tail lamp; a pattern film 23 for the tail lamp installed to be simultaneously stacked on the plurality of separation PCBs 22 for the tail lamp and having an optic 23a formed to implement three-dimensional emitting images 3 having a desired pattern using light of the plurality of LED light sources 21 for the tail lamp; an optical resin 24 stacked on the pattern film 23 for the tail lamp and uniformly transferring the light of the plurality of LED light sources 21 for the tail lamp across the entire section of the pattern film 23 for the tail lamp, and an LED light source 25 for a brake lamp installed between the plurality of LED light sources 21 for the tail lamp to thereby implement an emitting image 5 of the brake lamp.

Here, the LED light source 21 for the tail lamp has one end electrically connected to the separation PCB 22 for the tail lamp and the other end installed to be erected toward a front of the light source module, having a lens present therein, particularly, to be positioned at one side of the optic 23a formed on the pattern film 23 for the tail lamp.

The optical resin 24 is a medium for transferring the light of the LED light source 21 for the tail lamp to the pattern film 23 for the tail lamp. Since the light emitted from the LED light source 21 for the tail lamp is induced to the optic 23a of the pattern film 23 for the tail lamp through the optical resin 24, light efficiency may be improved.

As a material of the optical resin 24, polymethyl methacrylate (PMMA) or ultraviolet-ray (UV) curing resin may be used, but the present invention is not limited thereto.

In addition, the light source module 20 according to various embodiments of the present invention may further include a bracket 26 having the separation PCBs 22 for the tail lamp and the LED light source 25 for the brake lamp fixedly installed thereon, integrally covering side portions and rear portions of the stacked pattern film 23 for the tail lamp and the optical resin 24, and having a circular arc reflecting part 26a for irradiating the light of the LED light source 25 for the brake lamp to a front formed thereon, and a deposition reflecting surface 27 coupled to a front surface opposing the pattern film 23 for the tail lamp and an inner surface of the reflecting part 26a in the bracket, back-reflecting light of the LED light sources 21 for the tail lamp scattered to the rear to the front at the time of lighting the LED light sources 21 for the tail lamp, reflecting light of the LED light source 25 for the brake lamp to the front at the time of lighting the LED light source 25 for the brake lamp, and implementing hidden effect due to deposition at the time of non-lighting of the LED light sources 21 for the tail lamp and the LED light source 25 for the brake lamp.

The deposition reflecting surface 27 is to increase efficiency of light reflection. Here, the most of light emitted from the LED light sources 21 for the tail lamp may be output toward the front lens by the optic 23a of the pattern film 23 for the tail lamp to thereby implement an image having three-dimensional effect, while some of light may not be reflected by the optic 23a and may be scattered to the rear in which the separation PCB 22 for the tail lamp is present. Therefore, according to various embodiments of the present invention, the deposition reflecting surface 27 serves to back-reflect the light of the LED light sources 21 for the tail lamp scattered to the rear to the optic 23a of the pattern film 23 for the tail lamp at the time of the lighting of the LED light sources 21 for the tail lamp, thereby making it possible to significantly decrease light loss caused by the scattered light and additionally secure an amount of light. As a result, light efficiency of the rear lamp may be significantly improved.

The deposition reflecting surface 27 coupled to the reflecting part 26a of the bracket 26 may reflect the light of the LED light source 25 for the brake lamp to the front at the time of the lighting of the LED light source 25 for the brake lamp to thereby aid in more efficiently implementing the emitting image 5 of the brake lamp.

In addition, the deposition reflecting surface 27 may implement the hidden effect by the deposition at the time of the non-lighting of the LED light sources 21 for the tail lamp and the LED light source 25 for the brake lamp, thereby significantly aiding in implementing luxuriousness of the lamp.

Although the deposition reflecting surface 27 according to various embodiments of the present invention generally performs the same function as a reflecting film usually used in an optical field, the reflecting film is manufactured separately from other components of the light source module 20, while the deposition reflecting surface 27 according to various embodiments of the present invention is manufactured integrally with the bracket 26 by the deposition upon manufacturing the bracket 26, thereby making it possible to reduce the number of components and shorten a manufacturing process.

The optic 23a formed on the pattern film 23 for the tail lamp is formed in a direction perpendicular to an output direction of the light output from the LED light sources 21 for the tail lamp and light intensity (brightness) of the LED light sources 21 for the tail lamp is gradually decreased as it becomes distant from the LED light sources 21 for the tail lamp. By the principle described above, the light of the LED light sources 21 for the tail lamp reflected by the optic 23a is viewed as a three-dimensional shape by a naked eye as if it is downwardly gone as the optic 23a becomes distant from the LED light sources 21 for the tail lamp, thereby making it possible to implement the three-dimensional emitting images 3 having the three-dimensional effect at the time of the lighting of the tail lamp.

In addition, the light source module 20 according to various embodiments of the present invention may further include a protecting film 28 stacked on the optical resin 24, protecting the optical resin 24 and maintaining a shape of the optical resin 24.

The light source module 20 according to various embodiments of the present invention is characterized that it is formed in a flexible plate shape which is bendable to a curved surface. In this case, the protecting film 28 may serve to protect the optical resin 24 and to maintain a curved surface shape of the optical resin 24 bent to the curved surface.

As a material of the protecting film 28, polyethyleneterephthalate (PET) may be used, but the present invention is not limited thereto.

The three-dimensional emitting images 3 may be implemented by a combination of images of a straight line shape or images of a curve shape. Among these, the three-dimensional emitting image of the curve shape may be implemented by a plurality of optics radially formed from a center of a circle based on the curve.

In addition, the light source module 20 according to various embodiments of the present invention may further include a bezel 29 integrally coupled to the optical resin 24 along an edge of the optical resin 24.

The bezel 29 implements a bezel image by the deposition together with the deposition reflecting surface 27 along the edge of the lamp at the time of the non-lighting of the LED light sources 21 for the tail lamp, thereby making it possible to further improve a luxuriousness image of the lamp.

A portion opposite to the circular arc reflecting part 26a in the pattern film 23 for the tail lamp is cut and the cut portion of the pattern film 23 for the tail lamp is installed with a pattern film 31 for a brake lamp, such that the pattern film 31 for the brake lamp may be provided with an optic 31a to implement the emitting image 5 for the brake lamp having the desired pattern using the light of the LED light source 25 for the brake lamp.

Here, the optic 31a formed on the pattern film 31 for the brake lamp has a structure in which it is formed to have directionality different from the optic 23a formed on the pattern film 23 for the tail lamp to improve light distribution efficiency of the LED light source 25 of the brake lamp. The optic 31a formed on the pattern film 31 for the brake lamp may be formed to form an angle of 90° with the optic 23a formed on the pattern film 23 for the tail lamp.

According to various embodiments of the present invention, the light source module 20 may include at least one LED light source for the brake lamp 25.

Figure 6:
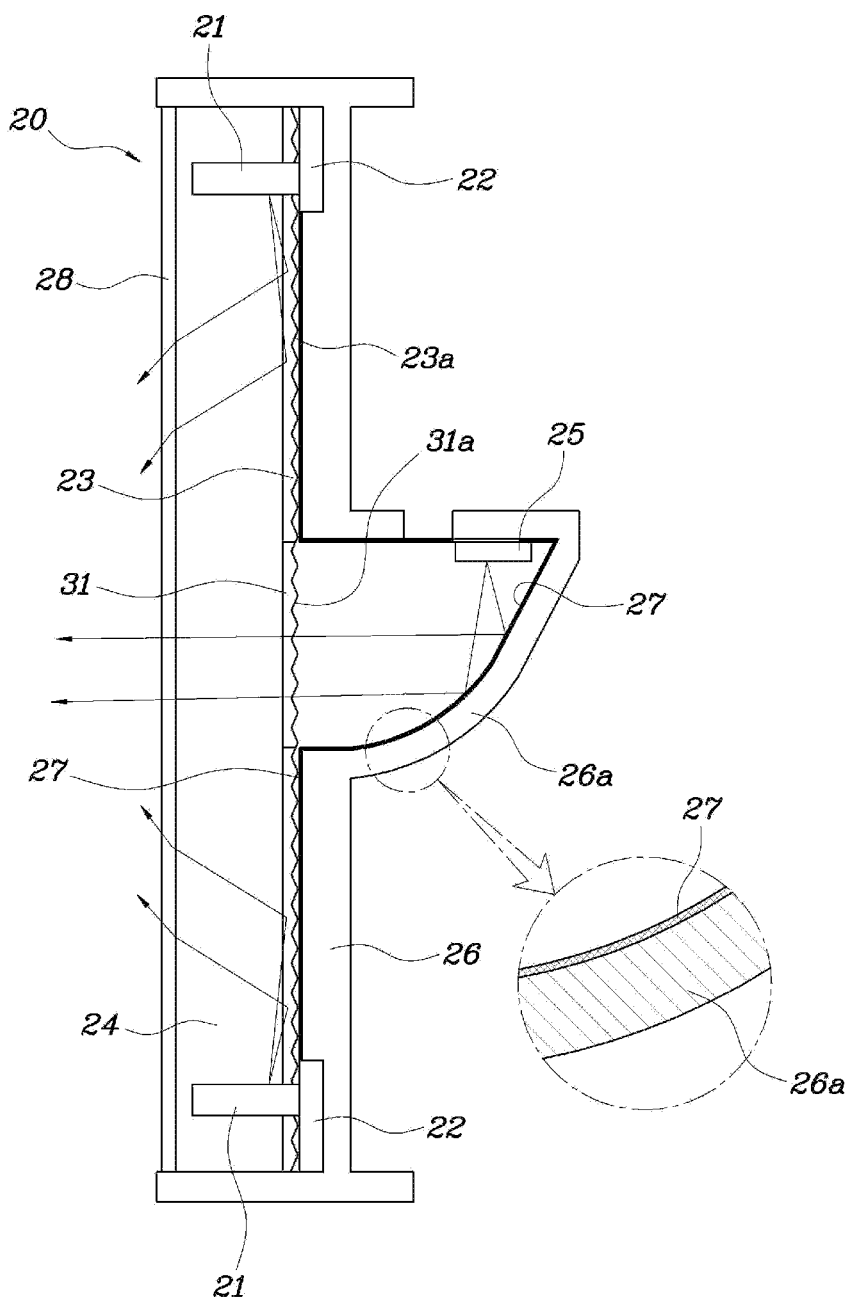
FIG. 6 is a cross-sectional view of a light source module used in FIG. 5.
Figure 7:
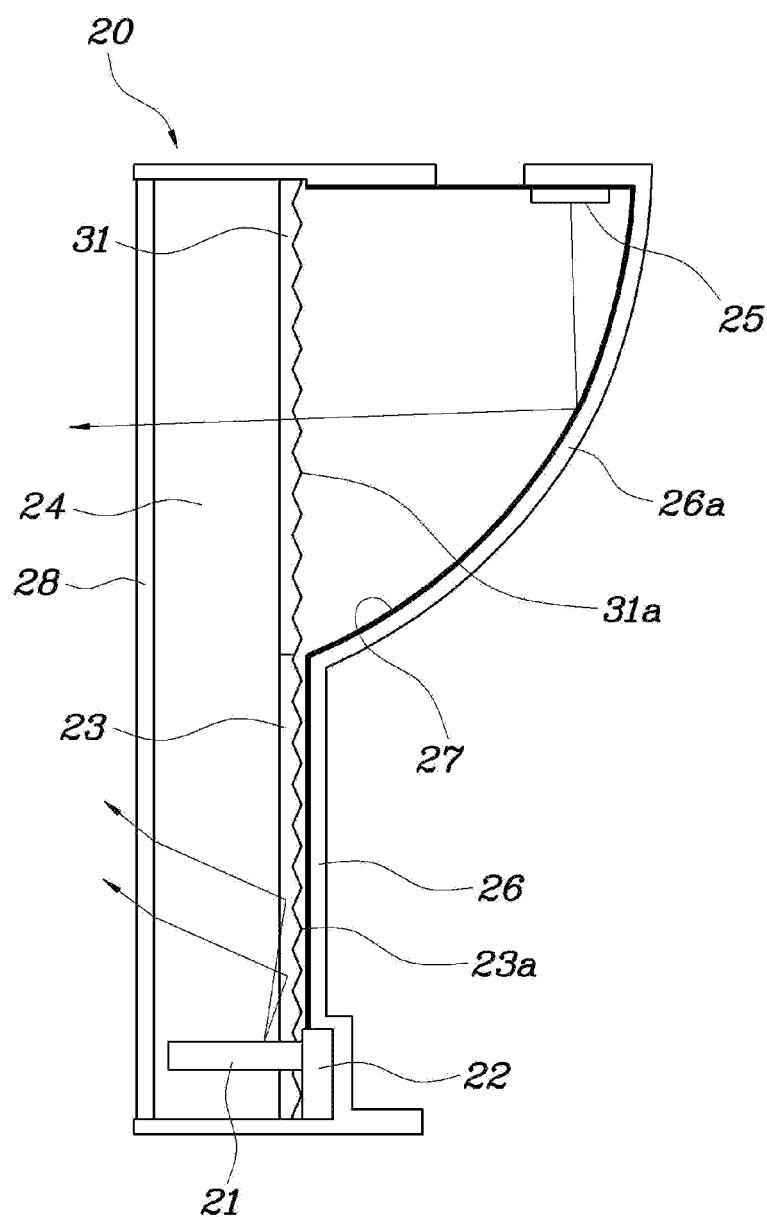
FIG. 7 is a cross-sectional view of a light source module used in FIG. 4.

The LED light sources 21 for the tail lamp may be installed to be spaced apart from each other by a predetermined interval along a horizontal direction of the bracket 26 at upper and lower portions of the bracket 26, and the at least one LED light source 25 for the brake lamp may be installed at a middle portion in a vertical direction of the bracket 26 as shown in FIGS. 3 and 6 or may be installed one by one between the LED light sources 21 for the tail lamp at the upper and lower portions of the bracket 26 as shown in FIGS. 4 and 7.

In the case in which the LED light source 25 for the brake lamp is installed at the middle portion in the vertical direction of the bracket 26, the emitting image 5 of the brake lamp may be implemented by the non-lighting inactive region 4 formed at the middle portion of the bracket 26 at the time of the lighting of the tail lamp as shown in FIG. 3.

In addition, in the case in which the LED light source 25 for the brake lamp is installed one by one between the LED light sources 21 for the tail lamp at the upper and lower portions of the bracket 26, the emitting image 5 of the brake lamp may be implemented by the non-lighting inactive region 4 formed between the LED light sources 21 for the tail lamp at the upper and lower portions of the bracket 26 as shown in FIG. 4.

The emitting image 5 of the brake lamp may be implemented as a general image without having three-dimensional effect to distinguish from the three-dimensional emitting images 3 of the tail lamp.

The light source module 20 according to various embodiments of the present invention configured as described above may be fixedly installed on the lamp housing 10 having one lighting region 11 and the lamp housing 10 may be fixedly installed on a vehicle body.

As set forth above, according to various embodiments of the present invention, the three-dimensional emitting images 3 may be implemented at the time of the lighting of the LED light sources 21 for the tail lamp in one lamp housing 10 having one lighting region 11 and the emitting image 5 of the brake lamp may also be implemented at the time of the lighting of the LED light source 25 for the brake lamp using the non-lighting inactive region 4 which does not implement the three-dimensional emitting image when implementing the three-dimensional emitting images 3, such that the reduction in weight and cost by the reduction in size of the rear lamp may be promoted and the installation space in the vehicle body may be more easily secured.

In addition, according to various embodiments of the present invention, the tail lamp may be implemented by the three-dimensional emitting images 3, such that luxuriousness of the lamp may be further improved, thereby making it possible to promote improvement in marketability of the vehicle.

Furthermore, the present invention may implement the hidden effect due to the deposition by the deposition reflecting surface 27 at the time of the non-lighting of the LED light sources 21 for the tail lamp and the LED light source 25 for the brake lamp, thereby making it possible to further improve luxuriousness of the lamp.

According to various embodiments of the present invention, the three-dimensional emitting images may be implemented at the time of the lighting of the LED light sources for the tail lamp in one lamp housing having one lighting region and the emitting image of the brake lamp may also be implemented at the time of the lighting of the LED light source for the brake lamp using the non-lighting inactive region which does not implement the three-dimensional emitting image when implementing the three-dimensional emitting image, such that the reduction in weight and cost by the reduction in size of the rear lamp may be promoted and the installation space may be more easily secured.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear lamp for a vehicle, the rear lamp comprising:
 a light source module capable of simultaneously implementing functions of a tail lamp and a brake lamp in one lighting region, the light source module including:
 a plurality of light emitting diode (LED) light sources for the tail lamp;
 a plurality of separation printed circuit boards (PCBs) for the tail lamp controlling current supply into the plurality of LED light sources for the tail lamp and installed to each be electrically connected to each of the plurality of LED light sources for the tail lamp;
 a pattern film for the tail lamp simultaneously stacked on the plurality of separation PCBs for the tail lamp and having an optic formed on the pattern film to implement three-dimensional emitting images with a desired pattern using light of the plurality of LED light sources for the tail lamp;
 an optical resin stacked on the pattern film for the tail lamp and uniformly transferring the light of the plurality of LED light sources for the tail lamp across an entire section of the pattern film for the tail lamp; and
 at least one LED light source for the brake lamp installed between the plurality of LED light sources for the tail lamp and implementing an emitting image of the brake lamp,
 wherein the light source module further includes:
 a bracket having the separation PCBs for the tail lamp and the at least one LED light source for the brake lamp fixedly installed thereon, integrally covering side portions and rear portions of the stacked pattern film for the tail lamp and the optical resin, and having a circular arc reflecting part formed on the bracket for irradiating light of the at least one LED light source for the brake lamp to a front of the light source module; and
 a deposition reflecting surface coupled to a front surface of the bracket opposite to the pattern film for the tail lamp and an inner surface of the reflecting part in the bracket, back-reflecting light of the LED light sources for the tail lamp scattered to a rear of the light source module to the front of the light source module at a time of lighting the LED light sources for the tail lamp, and reflecting light of the at least one LED light source for the brake lamp to the front of the light source module at a time of lighting the LED light source for the brake lamp.

2. The rear lamp of claim 1, wherein the light source module further includes a protecting film stacked on the optical resin, protecting the optical resin and maintaining a shape of the optical resin.

3. The rear lamp of claim 1, wherein the light source module further includes a bezel integrally coupled to the optical resin along an edge of the optical resin and implementing a bezel image by the deposition together with the deposition reflecting surface at the time of the non-lighting of the LED light sources for the tail lamp.

4. The rear lamp of claim 1, wherein a portion of the pattern film for the tail lamp opposite to the circular arc reflecting part is cut, the cut portion of the pattern film for the tail lamp is installed with a pattern film for a brake lamp, and the pattern film for the brake lamp is provided with an optic to implement the emitting image of the brake lamp having a desired pattern using the light of the LED light source for the brake lamp.

5. The rear lamp of claim 4, wherein the optic formed on the pattern film for the brake lamp is formed to have directionality different from the optic formed on the pattern film for the tail lamp to improve light distribution efficiency of the LED light source of the brake lamp.

6. The rear lamp of claim 5, wherein the optic formed on the pattern film for the brake lamp is formed to form an angle of 90° with respect to the optic formed on the pattern film for the tail lamp.

7. The rear lamp of claim 1, wherein the LED light sources for the tail lamp are installed to be spaced apart from each other by a predetermined interval along a horizontal direction of the bracket at upper and lower portions of the bracket, and the at least one LED light source for the brake lamp is installed at a middle portion in a vertical direction of the bracket or installed one by one between the LED light sources for the tail lamp at the upper and lower portions of the bracket.

8. The rear lamp of claim 1, wherein the light source module is fixed on a lamp housing having one lighting region and the lamp housing is fixedly installed on a vehicle body.

9. The rear lamp of claim 1, wherein the light source module is formed in a flexible plate shape which is bendable to a curved surface.

* * * * *